United States Patent Office 3,598,545
Patented Aug. 10, 1971

3,598,545
POTASSIUM SULFATE CRYSTALLIZATION PROCESS WITH THE ADDITION OF A POLYIMINE
Duane S. Lehman, Midland, Mich., assignor to The Dow Chemical Company, Midland, Mich.
No Drawing. Filed Jan. 5, 1970, Ser. No. 789
Int. Cl. B01j 17/02; C01d 5/00
U.S. Cl. 23—302
3 Claims

ABSTRACT OF THE DISCLOSURE

Disclosed herein is a novel process for crystallizing potassium sulfate from an aqueous solution thereof. The process comprises incorporating from about 0.02 to about 0.2 percent (based on weight of potassium sulfate) of a polyimine into the aqueous crystallizing solution. Prior to crystallization, the pH of the solution is adjusted to a level sufficient to import a formal charge to the polyimine. Crystallization is accomplished by commonly employed techniques such as cooling or evaporation. The resulting crystals are approximately of the same size and are consistently hexagonal in shape. In the absence of the polyimine additive, potassium sulfate crystallizes in an unpredictable variety of forms which have poor filtering and washing characteristics.

BACKGROUND OF THE INVENTION

In the absence of additives which modify crystal habit, potassium sulfate crystallizes from aqueous solution in an unpredictable manner. Often the crystals are small and are not easily washed or filtered. Frequently, the crystals are elongated with the crystal faces being "burred" and somewhat irregular. Nylander (U.S. 3,271,-106) discovered that crystal size is increased by incorporating specific "neutralized" sulfonates or sulfates into the aqueous crystallizing solution.

It is an object of the present invention to produce crystals of potassium sulfate having a predictable shape and surface configuration. More specifically, an object of the invention is to produce hexagonally-shaped sulfate crystals which have "smooth" surfaces and which possess approximately equal dimensions in all directions.

In relation to crystals produced without benefit of the polyimine additive, the crystals produced in the present invention are more ammenable to commonly employed processing operations such as sizing, washing, and filtering.

SUMMARY OF THE INVENTION

In the present invention, a small amount of a polyimine (e.g., an imine addition polymer or an amino condensation polymer) is added to an aqueous solution of potassium sulfate. Prior to crystallization, the pH of the solution is adjusted to about 5.1 or less. Crystallization of the salt is brought about by conventional means such as evaporation of the solvent, cooling, or a combination of both methods. The resulting crystals of potassium sulfate are pseudo-hexagonal in shape, i.e., when viewed along a major axis the crystals possess a hexagonally-shaped cross-sectional area. The crystal surfaces are also generally smooth and regular.

In practicing the invention, certain parameters are controlled. The concentration of polyimine in the aqueous crystallizing solution is from about 0.02 to about 0.2 weight percent of the amount of potassium sulfate solubilized prior to the beginning of crystallization. Preferably, the concentration of polyimine is from about .06 to about .15 percent by weight of the inorganic salt.

The pH of the solution prior to crystallization is maintained below about pH 5.1. Approximate hydrogen ion concentration is, however, largely dependent upon the degree of polymerization of the polyimine employed, i.e., more acidic conditions are employed as the molecular weight of the polymer decreases. Where the molecular weight of the polyimine is less than about 100,000, the approximate pH is from about 0 to 2. For polyimines with molecular weights above about 100,000 pH ranges of about 1 to about 5 are appropriate. Reagents used to obtain appropriate pH levels are mineral acids such as hydrochloric acid, sulphuric acid, and nitric acid.

Suitable polyimines are derived, for example, by the addition polymerization of alkylene imines containing the imino radical,

and have a molecular weight of at least 1000.

The linear polyimines are characterized by a long acyclic chain structure in which nitrogen atoms of imine groups are connected at intervals to carbon atoms.

The polyimines employed in the practice of the invention are water-soluble polyimines in which imino (—NH) groups are attached to carbon atoms and recur every two to three atoms in a main linear chain, preferably containing not more than 6 carbon atoms in any side chain. Where imino groups are separated from each other by ethylene groups, the linear polyimines are referred to as polyethyleneimines. Where the imino groups are separated from each other by propylene groups, the linear polyimines are referred to as polypropyleneimines.

The imine monomers preferably employed to prepare useful polymers contain not more than 7 carbon atoms. Of the monomers employed for making polyimines, some of those best suited for the purpose of the invention are classified as substituted ethyleneimines and have the structural formula:

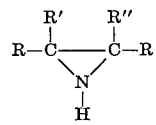

wherein R, R', R" are either hydrogen or acyclic hydrocarbon radicals containing from 1 to 3 carbon atoms. Examples of suitable imine monomers are set forth at columns 7 and 8 of U.S. Pat. 3,377,274.

The polymerization of ethyleneimine and its derivatives usually conducted at reduced temperatures using acid catalysts such as HCl and the like. The polymerization of the various monomers listed above is described in detail in the "Journal of Organic Chemistry," vol. 9, p. 500 (1944).

Linear polyimines can also be prepared by condensation reactions with the elimination of a hydrohalide. Thus, ethylene dibromide or propylene dibromide can be condensed with ammonia, ethylene diamine, diethylenetriamine, triethylenetetramine, tetraethylenepentamine, and/or dipropylenetriamine to produce polyimines, and the present invention contemplates the employment of such materials as crystal habit modifiers.

The molecular weight of the useful imine polymers should be at least 1000 and is preferably from 5000 to 150,000. If the addition and condensation reactions from which these polymers are derived are allowed to continue for too long a period of time or the conditions are not suitable, in fusible, water-insoluble resins may result. In the case of 2,2-dimethylethyleneimine, care must be used to control the reaction so that the materials produced are sufficiently water-soluble so that they can be employed at effective concentrations. Similarly, long chain water-soluble cationic polymers may be prepared by condensing formaldehyde with a polyalkylene polyamine such as tetraethylenepentamine to link the polyamines with a plurality of methylene bridges.

The polyimines are employed either in concentrated form or as aqueous solutions.

The following examples are set forth to illustrate the invention.

EXAMPLE 1

Water and reagent grade potassium sulfate were admixed in a 2000 ml., 3 necked, round bottom Morton stirring flask. Sufficient sulfate was employed so that the solution was substantially saturated when heated to 60° C. A 33% active aqueous solution of polyethyleneimine (molecular weight 150,000) was added to the aqueous mixture in sufficient amounts to provide a concentration of polyimine of about .06% based on weight of potassium sulfate. The pH of the solution was adjusted to about 1.0 with sulfuric acid. The mixture was heated to about 60° C. in a constant temperature bath. The heated mixture was allowed to cool from 60° C. to 25° C. over a period of four hours. During the cooling cycle, the solution was stirred at 400 revolutions per minute with a single paddle stirrer.

At the end of the cooling cycle, the aqueous mixture was filtered to obtain crystals of potassium sulfate. The crystals were dried in a vacuum oven. The dried sulfate crystals had an average diameter of about one millimeter. The crystals had a generally hexagonal cross-sectional area. The crystal surfaces were smooth and lacked the "burrs" commonly present in crystals produced without employing an additive.

EXAMPLE 2

Other runs were carried out following the technique of Example 1. In all the runs, the shape and surface characteristics of the crystals were similar to the crystals of Example 1. A summary of process parameters is set forth in the table.

| Run | Additive | Additive concentration (p.p.m.) | Diameter of crystalline (mm.) | pH of solution |
|---|---|---|---|---|
| 1 | No additive | 0.00 | 0.1–2.0 | 1 |
| 2 | PEI (I) | 0.02 | 1.5 | 1 |
| 3 | PEI (I) | 0.10 | 0.9 | 1 |
| 4 | PEI (I) | 0.20 | 1.2 | 5 |
| 5 | PEI (II) | 0.2 | 0.8 | 1 |
| 6 | PEI (III) | 0.2 | 1.0 | 1 |
| 7 | PAPA | 0.15 | 1.0 | 1 |

In run 1 of Example 2, no additive was employed and the resulting crystals were not of a uniform shape. The PEI (I) employed in runs 2–4 was polymerized ethyleneimine with a molecular weight of about 150,000. PEI (II) and PEI (III) are polymerized ethyleneimine having molecular weights of 80,000–100,000 and 1650–1950 respectively. In run 7, the additive (PAPA) was an amino condensation polymer of ethylene dibromide with an alkyldiamine. The PAPA polyimine had a molecular weight of about 100,000. In runs 2–7, the crystalline product had generally hexagonal cross-sectional areas. The crystals had diameters within the range of from 0.1 to 2 millimeters.

I claim:
1. In a process for crystallizing potassium sulfate from an aqueous system, the improvement which comprises incorporating into the aqueous system a small amount of polyimine having a molecular weight of from about 1000 to about 150,000.

2. A process as in claim 1 wherein from about 0.02 to about 0.2 weight percent of polyimine is present in the aqueous system based on the weight of potassium sulfate present therein.

3. A process as in claim 1 wherein the polyimine is polymerized ethyleneimine with a molecular weight of from about 5000 to about 150,000.

References Cited
UNITED STATES PATENTS

| 2,906,603 | 9/1959 | LaFont | 23—121 |
| 3,271,106 | 9/1966 | Nylander | 23—302 |

NORMAN YUDKOFF, Primary Examiner

S. SILVERBERG, Assistant Examiner

U.S. Cl. X.R.

23—300, 121